July 1, 1941. J. BERNFELD Re. 21,847

DUST DEFLECTOR

Original Filed July 14, 1936

JAMES BERNFELD
INVENTOR

BY Joseph Blacker
ATTORNEY

Reissued July 1, 1941

Re. 21,847

UNITED STATES PATENT OFFICE 21,847

DUST DEFLECTOR

James Bernfeld, Newark, N. J., assignor to The Hoover Company, North Canton, Ohio, a corporation of Ohio Original No. 2,120,347, dated June 14, 1938, Serial No. 90,454, July 14, 1936. Application for reissue April 10, 1940, Serial No. 328,932

10 Claims. (Cl. 183—51)

This invention relates to a dust deflecting device for vacuum cleaner dust bags and an object of this invention is to prevent the clogging of the mouth of a vacuum cleaner bag with an accumulation of dust and to provide a structure which has improved air flow characteristics.

Another object of this invention is to provide a dust deflecting funnel-shaped member having a tubular end which may be inserted into the rigid tubular mouth of a vacuum cleaner dust bag and retained in frictional engagement all around the inner circumference of said mouth and serving to keep the accumulated dust away from the mouth of the bag.

Another object of this invention is to provide an outwardly distending elastic resilient band encircling the inner circumference of the rigid tubular mouth of a dust bag for retaining the end of the tubular dust deflecting member therein.

Another object of this invention is to provide an elongated dust deflector made of material having an element of rigidity whereby the deflector will retain its elongated form while permitting transverse flexure in service.

Another object of this invention is to form the deflector body with outwardly extending means serving to space the dust deflector inwardly of the inner surface of the dust bag and providing a storage space intermediate the deflector body and the dust bag for collecting the dust discharged into the dust bag in an area removed from the mouth of the bag.

Another object of this invention is to provide the tubular lower end of the dust deflector with means which will permit said end to be distended or contracted in diameter while remaining in full contact all around the mouth of the dust bag.

With the above and other objects in view the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which.

Figure 1:
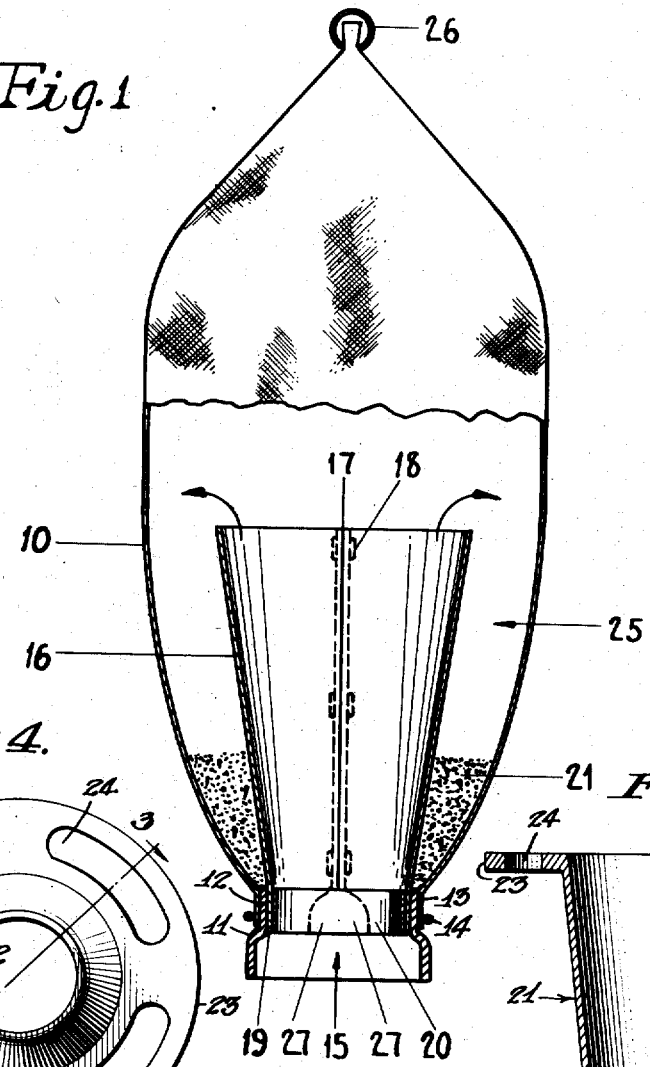
Figure 1 is a longitudinal cross-sectional view of a vacuum cleaner dust bag and a dust deflector in assembled relation, the dust bag being in an inflated position.

In the illustrated embodiment of the invention, the numeral 10 indicates a vacuum cleaner dust bag which is usually formed of woven fabric and is provided with a tubular metal sleeve 11 at its lower end.

The sleeve 11 is adapted to receive a discharge nozzle of a vacuum cleaner and be engaged thereto in any suitable manner (not shown). The sleeve 11 has a reduced upper end 12. The neck portion 13 of the dust bag is slipped over the end 12 and a tightly drawn metallic band 14 is used to clamp the sleeve 11 in unitary relation to the bag and so that the sleeve forms the mouth 15 of the bag 10.

For the purpose of preventing the clogging of the mouth 15 with the accumulated dust, I have provided a funnel-shaped dust deflector 16 which may be made of a flat piece of sheet material having its opposite side edges lapped radially along a longitudinal line 17 and preferably joined by eyelets 18. The dust deflector 16 has a tubular lower end 19 comprising two circumferentially overlapping flaps 27 which permit said end to be distended or contracted in diameter while in full contact all around the inner circumference of the reduced upper end 12 of the sleeve 11.

The dust deflector 16 is to be mounted inside the mouth 15 of the dust bag 10 with the tubular end 19 inside the upper end 12 of the sleeve 11. A slit resilient band 20 of substantially annular form and normally of larger diameter than the inner diameter of the tubular end 12 is then contracted in diameter and placed inside the end 19 of the dust deflector. The distending band presses the material of the deflector outwardly and holds it in frictional engagement all around the mouth of the dust bag.

The dust deflector 16 may be made of sheet rubber or other material having sufficient thickness or body so as to be somewhat rigid and be capable of maintaining its elongated tubular form under all service conditions without collapsing or falling down and constricting the neck 15.

When the motor is in operation, the dust flowing up through the dust deflector 16 follows the direction shown by the arrows and settles down in the annular space between the dust bag 10 and the dust deflector 16 and a gradually increasing quantity of dust 21 accumulates without clogging the mouth 15.

Figure 4:
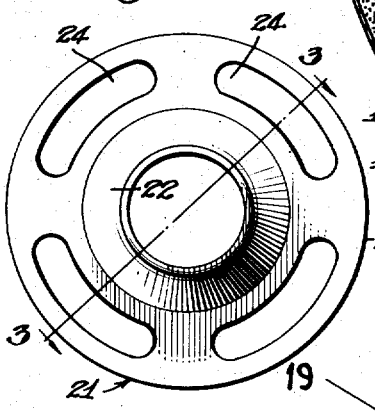
Figure 4 is a bottom plan view of the modified dust deflecting member shown in Figure 3, which may be molded in one piece and may have an integral outwardly extending flange serving to space the dust deflector away from the inner surface of the dust bag.
Figure 3:
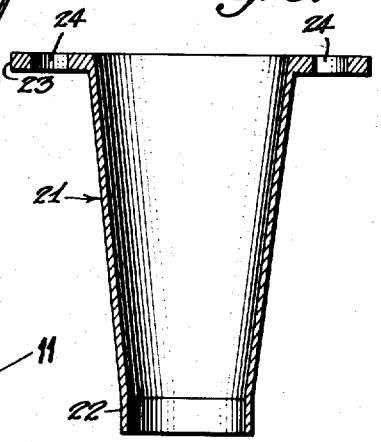
Figure 3 is a cross-sectional view of a modified dust deflecting member, the section being taken as on line 3—3 in Figure 4.
Figure 2:
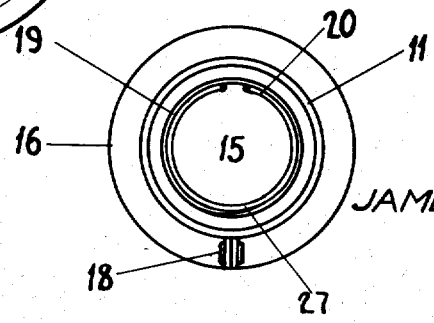
Figure 2 is a bottom view of the assembled metal mouth of the dust bag and the dust deflector.

As shown in Figures 3 and 4, I have provided a modified dust deflector 21 which may be molded in one piece and may preferably have a tubular body 22 and an integral outwardly extending flange 23 which is of larger extent than the body 22. The flange 23 serves to space the dust deflector away from the inner surface of the dust bag 10 shown in Figure 1. A plurality of apertures 24 are provided in the flange 23 to permit the dust coming through the mouth 15 of the bag 10 to pass therethrough and collect in the storage space 25, shown in Figure 1.

As dust bags are usually constructed, the size of the bag is very large but due to the fact that the collected dust settles back at or on the mouth of the bag, the mouth of the bag gets clogged when only a small amount of dust accumulates and this impairs the efficiency of the suction of the vacuum cleaner.

The structure herein described prevents the dust from collecting at the mouth of the bag and this increases the storage capacity of a dust bag without impairing the efficiency of the suction.

Due to the fact that the body of the dust deflector herein described has an element of rigidity, the collected dust cannot, at any time, press in the sides of the deflector and clog the mouth of the dust bag. Also, due to the rigidity of the body of the dust deflector it is possible to detach the dust bag from the vacuum cleaner nozzle without dropping any of the collected dust. This is accomplished by displacing the sleeve 11 from the exhaust outlet of the cleaner, the sleeve, the deflector and the bag then being removable as a unit. When a dust bag filled with dust is to be emptied, the clamp 26 is removed from the dust bag and the dust is emptied through the top, in the usual manner.

In accordance with the provisions of the patent statutes I have described the operation of my invention, together with the form of device which I now consider to represent the best embodiment thereof; but I desire to have it understood that the device shown is only illustrative and that the invention may be carried out by other means within the scope of the appended claims.

It is to be noted that materials having an element of rigidity, such as thick sheet rubber or a stiff buckram fabric which may be used for the dust deflector, will be strong enough to maintain the tubular shape while permitting transverse flexure in service, such as occurs when the dust bag is repeatedly lowered and raised.

A rigid dust deflector without transverse flexure would quickly wear out and destroy the dust bag while a dust deflector made of soft material without an element of rigidity would collapse and destroy the permanent storage space desired between the elongated dust deflector body and the body of the dust bag.

It is also to be noted that while I have shown overlapping flaps 27 to permit the tubular end of the dust deflector to be distended or contracted in diameter, so that the dust deflector will be readily interchangeable for use in vacuum cleaner bags having different size mouths, that the said flaps may be taken as representing any suitable means for performing the same function.

It is to be understood that the protection herein applied for is not confined to the particular combinations of features or elements referred to in the following claims, or described in the foregoing specifications or shown in the accompanying drawing, either independently or in combination.

I claim:

1. The combination with a dust collecting vacuum cleaner bag and an elongated dust deflecting funnel-shaped member therein, said bag having a tubular metal mouth and said dust deflecting member having a tubular end insertable in said mouth, overlapping means in said tubular end for distending said end prior to insertion in said mouth, and an outwardly distending resilient band adjacent the inner circumference of said mouth and retaining said tubular end in frictional engagement all around the inner circumference of said mouth, the body of said dust deflecting member having an element of rigidity whereby said member retains its elongated form while permitting transverse flexure in service.

2. The combination with a dust collecting vacuum cleaner bag having a tubular metal mouth and an elongated dust deflecting member therein, said dust deflecting member having a tubular end seated in said mouth, an outwardly distending resilient band adjacent the inner circumference of said tubular end and retaining said end in frictional engagement with the inner circumference of said mouth, the body of said dust deflecting member being flexible and having an element of rigidity whereby said member retains its elongated form while permitting transverse flexure in service, the end of said deflecting member having outwardly extending means serving to space said member inwardly of the side wall surfaces of said dust bag and forming a storage space intermediate said deflecting member and said dust bag for collecting the dust discharged into said bag without clogging said mouth.

3. The combination with a dust collecting vacuum cleaner bag and a dust deflecting member positioned therein, said bag having a tubular mouth at its lower end and said dust deflecting member having a tubular end, means for engaging the tubular end of said dust deflector and the mouth of said dust bag into unitary relation, the body of said dust deflecting member being flexible and adapted to be flexed upon receiving a force through the bag side wall upon contact with articles of furniture during cleaner operation yet having an element of rigidity and so adapted to maintain normally a position longitudinally of the dust bag, whereby air discharged into said dust bag will cause the surfaces of said bag to be spaced away from the exterior surface of said deflecting member and form a storage space therebetween for collecting dust without clogging the mouth of said dust bag, and outwardly extending means carried by said dust deflector for spacing said deflector away from the inner side wall surface of said dust bag.

4. A dust collecting vacuum cleaner bag and a dust deflecting member unit adapted to be mounted on a suction cleaner, said bag having a tubular mouth and said dust deflecting member having a tubular end engaged with the mouth of said dust bag, the body of said dust deflecting member being flexible and adapted to be flexed upon receiving a force through the bag side wall yet having an element of rigidity and so adapted to maintain normally a position longitudinally of the dust bag, whereby air discharged into said dust bag will cause the surfaces of said bag to be spaced away from the exterior surface of said deflecting member and form a storage space therebetween for collecting dust without clogging the mouth of said dust bag, and outwardly extending means carried by said dust deflector for spacing said deflector away from the inner side wall surface of said dust bag.

5. A dust deflector for a suction cleaner bag, comprising an elongated tubular body portion insertable into the mouth of the bag, said deflector being made of material having an element of rigidity for maintaining said tubular form, said body portion having a circumscribing flange at the end thereof spaced from said mouth, said flange being in angular relation with said tubular body portion.

6. A filtering unit for attachment to a suction cleaner and comprising a suction cleaner bag and a flexible dirt-laden-air-conveying member therein having a rigidity sufficient normally to maintain itself in normal shape but sufficiently flexible to permit flexure and distortion upon reception of a force exerted through the bag wall and when in service, said bag having a rigid mouth, one end of said member connected to said mouth, and bag spacing means carried by said member interiorly of said bag to space the side walls of said bag from said member.

7. A dirt-laden-air-conveying member adapted to be positioned within a dust bag having a mouth, one end of said member being adapted to be connected to said mouth and laterally extending bag-spacing means formed integrally on said member and spaced from said one end and adapted to space the side walls of an enclosing bag from said member in order to form a dirt-collecting space between said member and said bag.

8. A hollow dirt-laden-air-conveying member adapted to be mounted in a dust bag, said member being flexible but having a rigidity sufficient normally to maintain itself in normal shape but sufficiently flexible to permit flexure and distortion upon reception of a force exerted through the bag wall and when in service, said member having integral bag-spacing means formed thereon, the cross-sectional area of said member increasing from one end to the other, and a rigid seating element at one end of said member.

9. A dust deflector for a suction cleaner bag comprising a normally tubular passageway which is flexible to an extent sufficient to allow it to be flexed by contact forces exerted thereon by the walls of an enclosing dust bag when that bag is moved transversely relative to said passageway and into contact therewith, said passageway having sufficient rigidity normally to maintain its tubular shape when extended horizontally and supported only at one end, an integral transverse flange at one end of said passageway to function as bag-spacing means, and a seating element at one end to support said passageway upon the exhaust outlet of a suction cleaner.

10. A dust deflector for a suction cleaner bag comprising a normally tubular passageway of molded rubber which is flexible to an extent sufficient to allow it to be flexed by contact forces exerted thereon by the walls of an enclosing dust bag when that bag is moved transversely relative to said passageway and into contact therewith, said passageway having sufficient rigidity normally to maintain its tubular shape when extended horizontally and supported only at one end, an integral transverse apertured flange at one end of said passageway to function as a bag-spacing means, and a seating element at one end to support said passageway upon the exhaust outlet of a suction cleaner.

JAMES BERNFELD.